April 23, 1968     R. G. LEX, JR     3,380,066
EXTENDED RANGE RECORDER
Filed Dec. 22, 1966     3 Sheets-Sheet 1

United States Patent Office 3,380,066
Patented Apr. 23, 1968

3,380,066
EXTENDED RANGE RECORDER
Rowland G. Lex, Jr., Ambler, Pa., assignor to Leeds & Northrup Company, Philadelphia, Pa., a corporation of Pennsylvania
Filed Dec. 22, 1966, Ser. No. 603,799
12 Claims. (Cl. 346—32)

ABSTRACT OF THE DISCLOSURE

An extended range recorder having continuous marking means associated with the movable element of a circular slidewire in the measuring circuit of the recorder, the slidewire being provided with three or more equally spaced taps, and continuous range switching means for applying different potentials across the tapped portions of the slidewire in a manner to effect a change in range at a time when the tapped portion being switched is not actively employed in the measuring circuit.

BACKGROUND OF THE INVENTION

*Field of the invention.*—This invention relates to a device for recording desired information on a chart and more particularly, to a recorder the range of which is extended by means of multiple utilization of a width of chart.

*Description of the prior art.*—With many types of information desired to be recorded on chart paper, the measuring range is so large that to record the entire range across a single width of chart in a legible manner would require extremely wide chart paper. To overcome this difficulty, recorders have been devised which reuse a width of chart for different ranges of the measured variable. Heretofore this has generally been effected by switch means operated when the recorder pen reached the high or low end of the chart to change the effective voltage across a recorder slidewire of finite length. Upon actuation of the switching means, the balancing motor of the measuring system quickly returned the slidewire contact to one end of the slidewire and the recording pen from one edge of the chart to the other for recording in the next higher or lower range. In this type of recorder, means were provided to identify the range for each line trace made between switching operations.

Although extended range recorders utilizing a plurality of slidewire potentials to power a slidewire of fixed length in conjunction with means for multiple use of the chart width have been found acceptable for recording wide ranges of variables, the discontinuity of the record with time has left something to be desired. This has been overcome in some self-balancing type recorders by employing a multiturn, helical slidewire of finite length and continuous marking means comprised of a plurality of marking elements, or a marking helix which extends more than 360°, arranged in a manner such that as one marking element or portion approaches one edge of the chart and prior to its leaving the chart, another marker arrives in marking relation with the opposite edge of the chart. By this means the record is rendered continuous with time; however, the bulk of a long multiturn slidewire imposes an undesirable limitation on the range of a variable to be measured.

The present invention eliminates the aforementioned undesirable limitations.

*Summary of the invention.*—It is, therefore, an object of this invention to provide an extended range recorder with continuous range switching.

It is another object of this invention to provide an extended range recorder in which an adjustable slidewire for rebalancing a balanceable network may be switched from one range to another without loss of continuity of the record with respect to time.

It is yet still another object of this invention to provide an extended range recorder including a multiplicity of chart marking elements and a multiplicity of voltage sources which may be switched one after another to power different segments of a circular slidewire to produce a record which is continuous with time while providing for a range which exceeds that obtainable using a helical slidewire.

Briefly, these objects are obtained in a null-balance recording apparatus including a continuous circular resistive element provided with a plurality of taps, a continuous marking means for applying curve segments on a recorder chart in response to adjustment of a contact in a measuring circuit over only a selected portion of the circular resistive element, and by producing progressive changes in the level of a potential gradient produced around the circular resistive element by switching from one source of potential to another a tap common to two sectors of the resistive element which are not being used to balance the measuring circuit at the time the switching occurs.

While my invention is distinctly pointed out in the appended claims, the following specification may be utilized in aiding the reader to understand some of the various embodiments of my invention. To completely explain these embodiments, the following specification should be taken in conjunction with the following figures in the drawings in which:

*Brief description of the drawings.*—FIG. 1 is a diagrammatical representation of one embodiment of my invention;

FIG. 2 includes a series of graphs each beside a diagrammatic slidewire to illustrate voltage states at different instances of time;

Figures 1, 4:
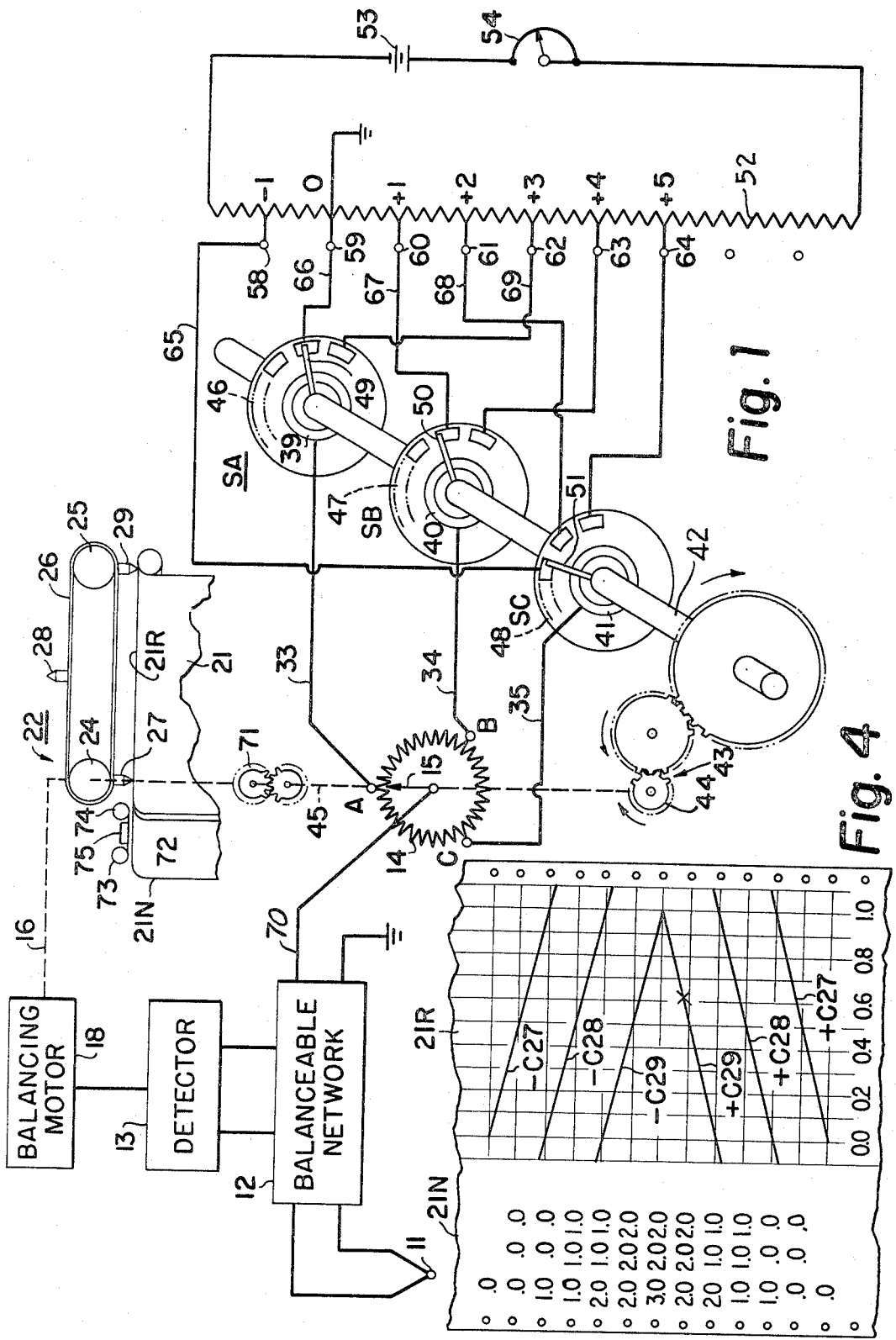
FIG. 4 is a plan view of a piece of chart illustrative of range identification useable with my invention.

*Description of the preferred embodiments.*—Referring now to FIG. 1, a transducer 11 capable of translating variations of any external variable into equivalent electrical signals is shown connected to a balanceable network 12, which may comprise a Wheatstone bridge or potentiometer network. The balanceable network 12 has connected thereto a detector 13 which is adapted to detect any unbalance of the network 12 due to changes sensed by the transducer 11. A slidewire 14 has an adjustable contact 15 connected via a conductor 70 to the network 12 to provide means for rebalancing the network when an unbalance occurs due to changes in the state of the transducer 11. The contact 15 is mechanically linked via a shaft 45 and reversing gears 71 to the output shaft 16 of a rebalancing motor 18 which is driven in response to output signals from the detector 13 in a direction to move contact 15 to a position restoring balance of the network.

The slidewire 14, in the embodiment shown in FIG. 1, is a circular resistive element which, as will be explained more fully hereinafter, provides a wide range of feedback voltages for rebalancing the network 12. As will be understood by those skilled in the art, the apparatus so far described, excepting the circular configuration of the slidewire, is similar to self balancing measuring systems, wherein the position of a contact along a slidewire bears a relationship to the value of a variable sensed by a transducer. United States Patent 2,113,164 issued to A. J. Williams, Jr., discloses one variety of null-balance recorder of the foregoing type. The values of a variable sensed by transducer 11 may be recorded on a chart 21 by means of a recording mechanism 22 mechanically linked to the shaft 16. The chart 21 comprises a right hand calibrated portion 21R and a left hand ranging portion 21N. For reasons later to be described, the recording mechanism 22 includes a pair of sprocket wheels 24 and 25 and an endless belt 26, carried by these wheels. The belt supports three marking elements such as pens 27–29. The pens 27–29 are spaced on the belt 26 such that as one leaves the chart, the next one will have come into recording engagement with the chart to effect a slight overlap in record element to be produced. Hence the plural pen system constitutes one form of a continuous recording or marking means. The use of continuous marking means makes it possible to employ continuous range switching for the recorder in a manner more fully described hereinafter.

The circular slidewire 14 shown in the embodiment of FIG. 1 is provided with three taps, A, B and C, spaced 120° apart. Taps A, B and C are shown connected via conductors 33–35, respectively, to slip rings 39–41 of rotary switches SA, SB and SC, respectively. The rotary switches SA–SC are mounted on stationary means (not shown) and have a common shaft 42 which is supported for rotation about the central axis of the switches by suitable bearings (not shown). The shaft 42 is driven by the shaft 45 through a reduction gear train 43 which includes a gear 44 mounted on the shaft 45, to which the slidewire contact 15 is secured. By means of the structure described, rotation of the slidewire contact 15 and rotation of the shaft 42 are related, the amount of rotation of shaft 42 depending upon the gear ratios of the gear train 43.

The rotary switches SA–SC are of the non-shorting type, each containing a plurality of stationary contacts 46–48 mounted near their outer peripheries. Movable brush contacts 49–51 are driven by the shaft 42. Each is mounted such that electrical contact is made between the respective slip rings 39–41 and individual ones of the plurality of contacts 46–48 of the respective switches. Thus, upon rotation of the shaft 42, different contacts of the sets of contacts 46–48 become electrically connected to the slidewire taps A–C, respectively via the movable brush contacts 49–51 and the conductors 33–35.

The movable brush contacts 49–51 are angularly disposed with respect to each other about the shaft 42 such that upon rotation of the shaft 42 the brushes 49–51 progressively break then make contact with successive contacts 46–48 individually and in succession, rather than simultaneously. This feature is illustrated in FIG. 1 wherein upon clockwise rotation of the shaft 42, it is apparent that brush 51 will be the first brush to break and thereafter make contact with a successive contact 48 on rotary switch SC, followed in order by brushes 49 and 50.

According to this invention, a plurality of constant electrical reference sources are provided which, in the embodiment of FIG. 1, comprise a resistive element 52 connected to a constant source 53 and an adjusting means 54 connected in series therewith. The constant source 54 may be either a constant current or a constant voltage source, depending upon how the recorder is to be used. A plurality of taps 58–64 are shown provided on the resistive means 52 at spaced intervals. It will be understood that any number of taps may be provided on the resistive means 52 and that the total number of taps shown in FIG. 1 has been limited purely for the sake of simplicity. In this same light, it will be understood that the total number of contacts 46–48 provided on the rotary switches SA–SC is not limited by this invention, but rather, may include any number depending upon the environment in which the extended range recorder, according to this invention, is to be employed.

Each of the taps 58–64 on the resistive element 52 constitutes a stable reference source the impedance of which is low relative to that of resistive element 14.

Each tap is connected via conductors to individual ones of the plurality of contacts 46–48. As illustrated in FIG. 1, the tap 58 is connected via conductor 65 to a contact of the rotary switch SC. In a similar manner the tap 59 is shown connected via conductor 66 to a contact on the rotary switch SA. Tap 60 is shown connected via conductor 67 to a contact of the rotary switch SB. Tap 61 is shown connected via conductor 68 to another contact of the rotary switch SC. Tap 62 connects via conductor 69 to another contact on SA. Other conductors connect other taps on the resistive element 52 to other contacts of the rotary switches SA–SC as shown in FIG. 1. In order to make the drawing more readable, additional taps, switch segments, and connections therebetween have been omitted; however, it will be understood that in the practice of this invention, more of these will be provided. It will be apparent that the general arrangement is such that every fourth tap on the resistive element 52 is connected to a succeeding contact of a certain one of the rotary switches SA–SC. Thus, in FIG. 1, if the resistive element 52 were extended to show several more taps, each of these taps would be connected in sequences of three to additional successive contacts on each of the rotary switches.

As will be apparent to those skilled in the electrical arts, the resistive element 52 with its plurality of taps connected to a constant current source 53 comprises a voltage divider, whereupon the voltages present at the successive taps vary from each other in finite steps. In FIG. 1, the tap 59 is shown connected to ground. The voltages present at taps 60–64 will be successively higher than the voltage present at tap 59 and the voltage at tap 58 will be lower. By suitably spacing the taps, the voltage divider can be made to present voltages at the successive taps which are spaced apart in steps of equal magnitude; however, if desired, the steps may be unequal, as required when a transducer 11 is employed having a non-linear output with change in a condition to be measured.

It will be apparent, in the illustrated embodiment of my invention, that only three of the taps provided on the resistive element 52 can be connected through movable contact brushes 49–51 of the rotary switches SA–SC at any one time. Therefore, the taps on the slidewire 14 are connected at any instant of time to no more than three different taps on the voltage divider 52. As will be clear, less than three taps will be connected during a switching operation.

According to this invention, the slidewire taps A, B and C, except during switching, are at all times connected to successive voltage divider taps to provide a voltage gradient in a clockwise direction around the slidewire 14 which, when plotted as a function of angular position of the adjustable slidewire contact 15 on the slidewire 14, may be a series of linear curves. The present invention may be more easily understood with reference to FIG. 2 illustrating this latter feature.

Figure 2:
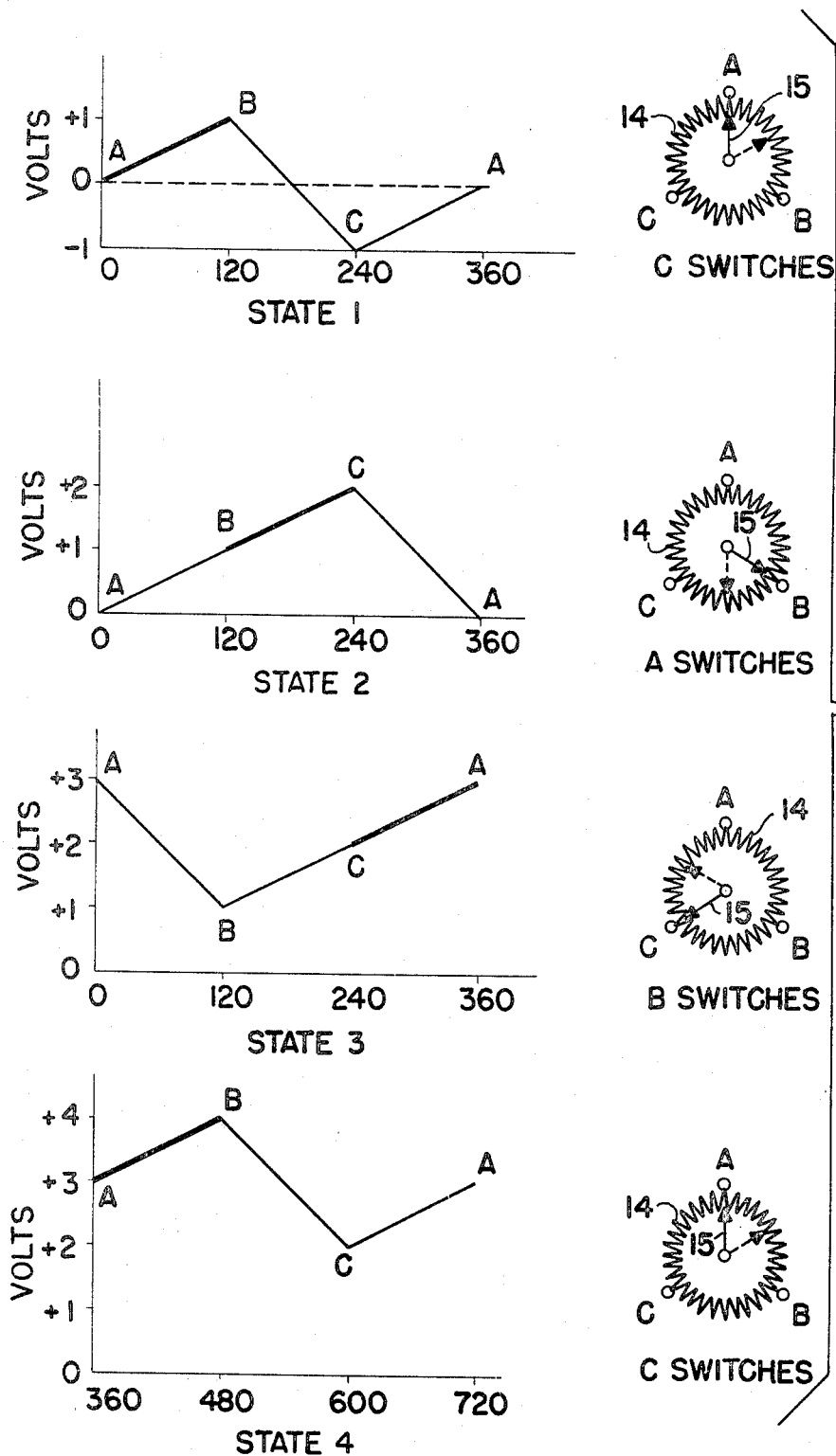

Referring now to FIG. 2, in addition to FIG. 1, a series of four graphs show four different states of the voltage distribution around the slidewire 14. Beside each graph there is included a diagrammatical representation of the slidewire 14 and its adjustable contact 15 for reference with respect to each graph. Referring to state 1 of FIG. 2, contact 15 is shown directly over tap A of the slidewire 14 in its position for balance at the low end of the lowest range of the recorder. At this time, tap A is connected to tap 59 on the voltage divider 52. For the embodiment to be described with reference to FIG. 2, the voltage divider 52 in FIG. 1 may be considered a series of one-volt steps with the zero-volt reference potential being connected to tap 59. Therefore, taps 60, 61, 62, 63, and 64 will be at successive one-volt potential differences in a positive direction, while tap 58 will be at a one-volt potential difference going in a negative direction. In state 1 of FIG. 2, tap A of the slidewire 14 will be at zero volt. Tap B is at one-volt positive potential and tap C at one-volt negative potential as a result of the rotary switch movable brush contacts 49–51 being in the positions shown in FIG. 1.

According to the illustrated modification of this invention, the slidewire contact 15 is mechanically linked to the continuous marking mechanism 22, such that a pen will traverse the calibrated width 21R of the chart 21 as the contact 15 moves 120°, i.e., the distance between any pair of taps A, B and C. In state 1 of FIG. 2, the bold line portion of the voltage gradient is the portion utilized for rebalancing the measuring system and to produce a record on the chart as a pen 27 moves from left to right across the chart. This portion begins at tap A at which the slidewire contact 15 is shown and extends to tap B. When the contact 15 is moved clockwise to rebalance the measuring system as a result of an unbalance thereof, upon an increase in the magnitude of a condition sensed by transducer 11, the pen 27 will move to the right in chart area 21R and shaft 42 will turn at the same time to advance the brush contacts 49–51. When contact 15 is at about the 60° point, i.e., half way between taps A and B of the slidewire 14, the brush contact 51 will have moved to the next successive contact 48 to connect tap C of the slidewire 14 to tap 61 of voltage divider 52 to apply a potential of plus two volts to tap C, thus changing the potential across section B–C of the slidewire 14 at a time when it is not being used.

Referring now to state 2 of FIG. 2, the slidewire contact 15 is shown rotated in a clockwise direction 120° from tap A to tap B. As mentioned above, during the rotation of the slidewire contact 15 from tap A to tap B the pen 27 moves across chart section 21R, the movable brush contacts 49–51 of rotary switches SA–SC move, and the contact 51 of the switch SC opens the circuit to tap 53 on the voltage divider 52 and establishes a circuit via the next successive contact and the conductor 68 to tap 61 of the voltage divider 52. Hence, tap 61 being at plus two volts, the voltage gradient of the slidewire is as shown in state 2 of FIG. 2. By the time the contact 15 arrives at tap B, pen 27 has moved to the righthand side of chart section 21R and pen 28 has moved to position for recording. As can be seen in state 2 of FIG. 2, the portion of the voltage gradient which is used to record on the chart paper by marker 28 is shown in bold line extending from tap B to tap C, which is a new recording range.

In the same manner and for the same reason as before, when the contact 15 of slidewire 14 advances to a point about midway between tap B and tap C, marker 28 will have moved to the right in the chart area 21R, and the shaft 42 will have rotated so that the rotary switch brush 49 will have moved clockwise to the next successive contact to establish a potential of plus three volts at tap A. Hence, when the slidewire contact 15 reaches tap C on the slidewire 14, a new range is ready for recording. Upon arrival of contact 15 at tap C, a new pen 29 will have arrived in recording position and pen 28 will be about ready to leave the chart. At this time the voltage gradient on the slidewire will then appear as shown in state 3, wherein tap B still has a potential of plus one volt, tap C a potential of plus two volts and now tap A a potential of plus three volts.

From the first three states of FIG. 2, it is apparent that the switching from one state to another occurs at points on the slidewire which are not included within the bold line recording range, so that no discontinuities appear on the record chart.

Referring to state 4 of FIG. 2, the configuration of the slidewire is shown after the slidewire contact 15 has moved from tap C to tap A, the potential applied to tap B having been changed from plus one volt to plus four volts, due to passage of movable brush 50 from one contact 47 to the next, at about the 300° position of contact 15, and pen 27 has returned to its initial position on the chart 21. At this time the slidewire contact 15 has been rotated exactly 360° in a clockwise direction from its position shown in state 1. Thus, state 4 shows the voltage gradient as it would appear after changing the potential once at each of the taps C, A and B, in that order, so that the gradient between taps A and B is now ready for a second revolution of the slidewire contact 15 over the slidewire 14 and a second pass of pen 27 across the chart to record through a fourth range.

Although the magnitudes of the voltage gradient, between each pair of taps utilized for recording is a matter of choice, it is desirable to make each of them equal in angular length about the slidewire. While three taps have been illustrated on the slidewire 14 it is to be understood that more than three may be used and although three pens have been illustrated, it should be understood that more than three may be used. Likewise, it should be understood that while a pen is illustrated as traversing the chart while the contact 15 moves from tap to tap, this phase relationship is not critical as long as tap switching takes place when the contact 15 is at a point between two taps along the slidewire 14, neither of which is the tap being switched. The best position for the contact 15 with respect to the circular slidewire 14 at the time of switching is a point diametrically opposite the tap on slidewire 14 where the voltage is to be changed. It will be apparent that the operation depicted in the series of states 1–4 of FIG. 2, illustrating clockwise rotation of the slidewire contact 15, is reversible for counterclockwise rotation of the slidewire contact 15 to its starting point at the low end of the first range.

As has already been stated, the continuous marking means for the chart is mechanically linked to the contact 15 of the the slidewire 14, such that a 120° movement of contact 15 between a pair of taps causes one of the three pens 27–29 to traverse the chart width from one edge to the other of the calibrated portion 21R of the chart. The three markers, 27–29 are positioned on the endless belt 26 at 120° points, such that preferably slightly before one marker reaches one edge of the calibrated chart portion 21R, another of the markers will begin to record on the chart at the other edge thereof, as the contact 15 moves onto and over the next 120° portion of the slidewire 14 adjacent the portion which was being used for recording previously. The dimensions of the related parts are desirably such that two pens are always on the chart when the contact 15 is at one of the taps on the circular slidewire in a three tap modification.

Figure 3:
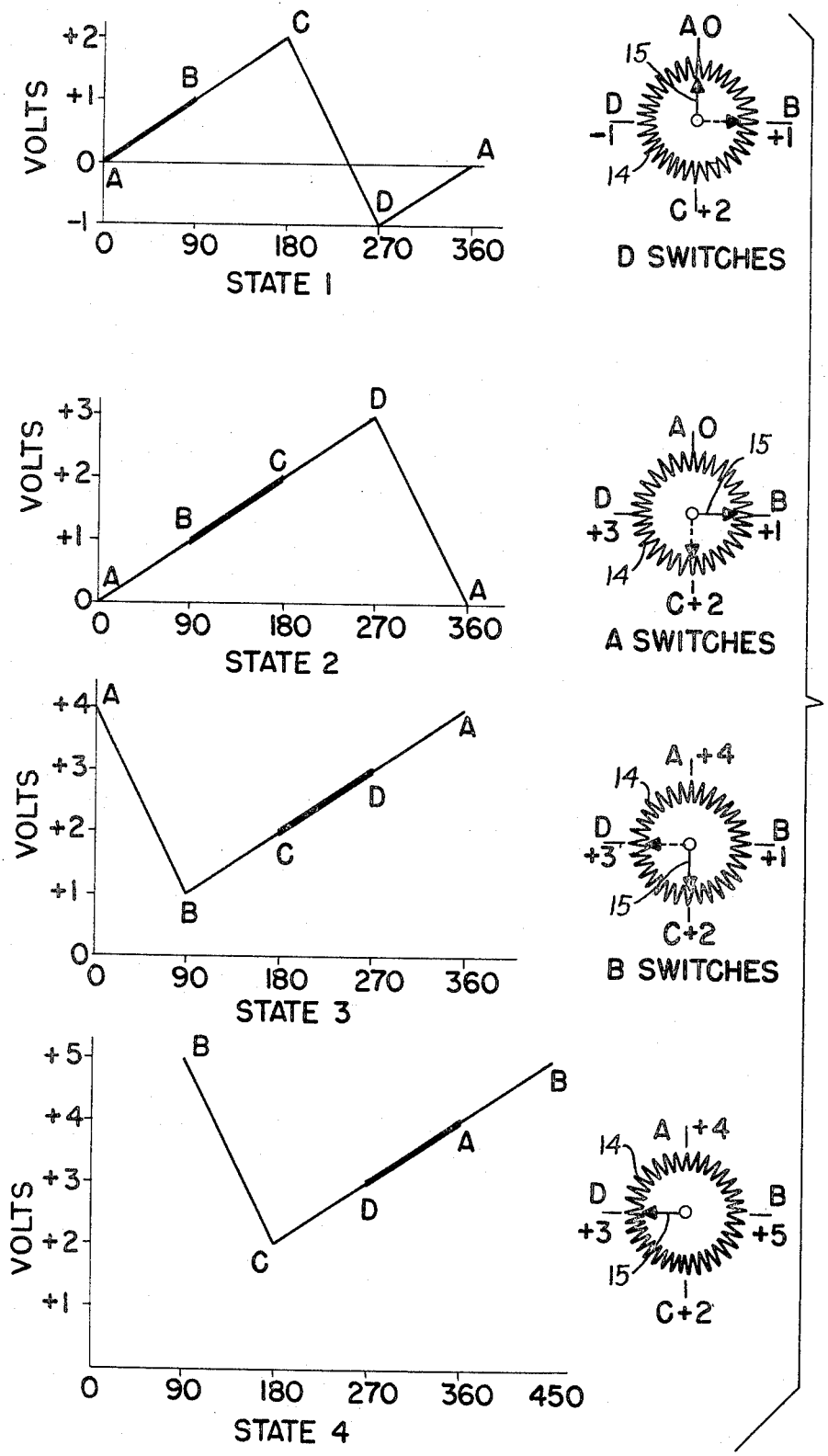
FIG. 3 is similar to FIG. 2 and is illustrative of another embodiment of my invention.

It will be apparent to those skilled in the art that the principles of this invention are not limited to a slidewire divided into three 120° segments with three equally spaced taps thereon. Reference to FIG. 3, states 1–4, will show the principles of this invention being carried out with a circular slidewire having four taps A–D at the 90° points thereon. In this embodiment the switching for effecting a change in the voltage applied to a particular tap preferably occurs when the contact 15 is in a region of the slidewire which is diametrically opposite the tap being switched. In FIG. 3, state 1, the bold line portion of the voltage gradient indicates that the 90° recording portion thereof lies on a linear portion of the voltage gradient from A to B. In state 1 of FIG. 3, although the contact 15 of the slidewire is shown operating between taps A and B, it will be clear to those skilled in the art that any portion of the slidewire going clockwise from D to C could be used for recording, hence three markers could be used, or some other number such as four. Assuming clockwise rotation of the contact 15, when it approaches tap B at a slidewire voltage of 1.0 volt, the slidewire tap D, which is farthest away in voltage magnitude, is switched from −1.0 volt to +3.0 volts, so that the slidewire gradient appears as indicated in state 2 of FIG. 3.

The four tap configuration of FIG. 3 allows more time for switching than the three tap arrangement; however, in neither case is switching a problem or in any way critical. The location of a switching operation is arbitrary, so long as it is effected at a time when the tap switched is not included in the segment of the slidewire being used for recording.

States 3 and 4 of FIG. 3 further illustrate the invention in the 4-tap embodiment. State 3 shows Tap A as having been switched from 0 to volt to +4 volts, while the wiper blade is passing through the 2.0 volts position and state 4 shows tap B switched from 1.0 volt to 5.0 volts, while the slidewire is passing through the 3.0 volts position in a clockwise direction. It will be apparent that in the embodiment of FIG. 3, curves will always be recorded on the chart in a manner continuous with time due to the fact that switching occurs in a manner to produce a continuous change in the voltage gradient along the slidewire with time.

As will be evident from the foregoing description with each change of range, one marking element of the continuous marking means will leave the chart after another marking element comes into contact with the chart to record curve segments such as those indicated in FIG. 4 by +C27, +C28, +C29, −C29, −C28, and −C27. The curves shown indicate increasing and decreasing values of the measured variable in ranges of magnitude recorded by pens 27, 28, and 29. To render such a record readable, that is to say, to make it possible to determine the value of a measured quantity from the record, it is necessary to identify the range of magnitude for each segment of the record. There are several ways to accomplish the foregoing; however, only one will be described.

Referring to FIGS. 1 and 4, a portion of a pre-punched tape 72 is shown disposed above the left hand portion 21N of the chart 21. This tape is caused to travel backward or forward between a supply spool 73 and a takeup spool 74. The tape is pre-punched with sets of numbers along its length. Each set of numbers corresponds to the passage of a pen marker across the chart so that the chart can be marked by a stenciling operation by means of cyclically depressing an inked presser bar 75 in synchronism with the chart paper advance. This is accomplished by means not shown since it forms no part of the present invention and can be easily arranged by one skilled in the art. The chart 21 is constantly advancing downwardly at some pre-selected speed and the ink presser bar 75 is continuously and periodically depressed in timed relation with the chart advance thereby to stencil at predetermined intervals whatever numbers appear in the portion at the tape 72 overlying the chart section 21N. The stenciling is affected by a transfer of ink from the presser bar 75 through the numerical perforations in the tape 72 to the chart paper.

When the value of a measured condition is at the low end of the lowest range of the recorder, the pen marker 27 will be in the position illustrated in FIG. 1. In this condition, the first of a set of numbers on the tape 72, which desirably is a set of zeros, is over the left hand side of the chart section 21N. Thus, as the pen 27 moves from left to right across the chart on its first pass, the curve segment traced by the pen 27 can be identified by zeros printed on the chart section 21N. As the pen 27 continues its left to right movement, more zeros will be printed on the chart section 21N as illustrated in the first and second rows of numbers (up from the bottom) shown in FIG. 4. It has been determined that the section 21N should be at least wide enough to print three numbers at a time from the tape 72 so that adjacent curve segments can always be identified when a change in range occurs. Thus, as pen 27 reaches the right hand edge of the chart and the pen 28 has just arrived in recording position at the left hand side of the chart, a number "1.0" punched in the tape 72 will be in position over the left hand side of the chart section 21N so that the three numerals printed will be as shown in the third row from the bottom of FIG. 4. As pen 28 moves across the chart and pen 27 has been completely removed from the chart, the last of the zeros punched in tape 72 will have passed from a position overlying the chart section 21N and will be replaced by a "1.0." During the first passage of pen 28 across the chart, the "1.0's" printed on the chart section 21N, as shown in row 4 of FIG. 4, identify the range in which the pen 28 is recording. As the pen 28 moves into the right hand portion of the chart section 21R, and as the pen 29 begins to move into the left hand portion of the chart section 21R, the first of a set of "2.0's" in the tape 72 will begin to overlie the left hand side of the chart section 21N. Then as the pen 29 begins to record a curved segment on the chart section 21R, the segment will be identified by the numeral "2.0" stenciled on the chart section 21N as shown in the fifth row of FIG. 4. The remaining rows of numbers shown in FIG. 4 printed on the left hand portion 21N of the chart are printed as a result of the recording of the curve segments shown on the right hand portion 21R of the chart. As will be more apparent in the description to follow, the stenciling operation just described permits easy identification of the range in which the pens are recording at any particular instant of time. As will be clear to those skilled in the art the number of rows per unit length of chart may desirably be greater than shown in section 21N by more frequent operation of presser bar 75. The minimum number necessary have been illustrated.

As indicated in the portion of this specification describing the switching which alters the voltage at the taps of the circular slidewire, the number of ranges for a recorder is dependent upon the number of voltage steps provided. It is believed clear that the number which may be provided is essentially without limit, as long as space is provided for the necessary switching functions illustrated by the rotary switches SA–SC and for the number and kind of individual voltage or current sources such as illustrated by the voltage divider comprised of the tapped resistor 52, since in this invention the chart section 21R and the circular slidewire 14 are used over and over again. The tape 72 may be as long as required and the number of sets of perforated numbers may be as many as required to identify the different recorder ranges. For purposes of illustration, the curves C27, C28, C29, −C29, −C28, and −C27 shown in chart position 21R, indicate that the measured variable has increased from zero to three volts and then back to zero. The range identification numbers are shown only in FIG. 4 because of the small scale of FIG. 1 of the drawings.

As an example of how the chart 21 is read for a specific measured variable, the point X on curve +C29 will be read as 0.62 plus 2 or 2.62 volts. From the "0's" printed in chart area 21N, it is always clear that curve C27 was made on the first traverse of pen 27 across the chart area 21R. As will be noted, a slight overlap is provided in the curves to insure continuity of the total record with time. Curves +C28 and +C29 are first crossings of pens 28 and 29, respectively and each represents a new range as previously described. When the value of the measured quantity increases above 0.9, it can be read from either curve C27 or curve C28 without confusion, since values on curve C28 below the zero calibration line in chart section 21R do not take the additive value "10," showing in chart section 21N. All points on curve C28 above the zero calibration line have the marginal "10" added, as do all values on curve C27 above the tenth calibration line in chart area 21R. In like manner, curve +C29 takes the highest addition factor showing in chart area 21N for values along the curve above the zero calibration line and the lowest value showing for points below the zero calibration line. As the value of a measured quantity decreases, the curves will be similar, but with a reversed slope, as shown in curves −C29, −C28, and −C27. For this case, the range information will appear just the same and be read in the same way.

From the foregoing it will be clear that applicant has disclosed a multi-range recorder wherein a width of chart and a circular slidewire are used over and over again to provide a record which is always continuous with time.

While the pinciples of this invention have been described with respect to only two embodiments, it will be apparent that several embodiments of this invention may be devised by those skilled in the art after reading this specification. Thus, I do not wish to be limited to the two embodiments described. Nor do I wish to be limited to the specific structure described and illustrated with respect to FIG. 1. For example, the switching means, while described as a mechanical rotary switch, may just as easily be substituted by some electronic switching means, such as a bidirectional semiconductor switching circuit. Additionally, for the tapped voltage divider utilized in the embodiment of FIG. 1 to provide a plurality of different level voltage sources, there may be substituted any other convenient multi-level voltage or current source or sources. Finally, the exact magnitudes of voltages described in this specification, for instance, the 1-volt span between different taps on the voltage divider, the three taps 120° apart on the circular slidewire, and the use of three marking devices may be substituted for by other convenient arrangements without departing from the spirit and scope of this invention. For example, a circular slidewire with more than three taps may be used, a continuous marking means with more pens or a different form of continuous marking means may be employed, the phase relationship between markers and the discrete portions of the circular slidewire may be different and the precise points for tap switching may be different, so long as the continuous uninterrupted range change and marking are retained to preserve the continuity of the record with time. Thus, in order to insure full protection of my invention, I wish to be limited only by the spirit and scope of the appended claims.

What is claimed is:

1. An extended range recorder comprising:
   (a) a slidewire adjustable to balance a measuring circuit sensitive to an external condition,
   (b) a continuous marking device movable with adjustment of said slidewire for providing indications of the magnitude of the external conditions,
   (c) a plurality of electrical sources at successively higher levels of magnitude,
   (d) switching means actuatable upon adjustment of said slidewire to connect successively higher or lower levels of said sources to said slidewire to provide higher or lower orders of available measuring range to said measuring circuit,
   (e) said switching means and said slidewire characterized in that
      (1) a fractional portion of the total extent of said slidewire is effective to cause an element of said marking device to sweep across its entire path of recording movement, and
      (2) said switching means effects range switching to said slidewire at points thereon not including said fractional portion.

2. An extended range recorder comprising:
   (a) a slidewire adjustable to balance a measuring circuit sensitive to an external condition,
   (b) a continuous marking device movable with adjustment of said slidewire for providing indications of the magnitude of the external conditions,
   (c) a plurality of electrical reference sources at successively higher levels of magnitude,
   (d) switching means actuatable upon adjustment of said slidewire to connect successively higher or lower levels of said sources to said slidewire to provide higher or lower orders of available measuring range to said measuring circuit,
   (e) said switching means and said slidewire characterized in that
      (1) at least three consecutive levels of said sources are connectable to three separated points of said slidewire,
      (2) said switching means switches a first of said points to a next successive higher or lower source than the source to which the last of said points is connected, thus providing a higher or lower balancing range for said measuring circuit depending upon adjustment of said slidewire to higher or lower levels respectively, and
      (3) said measuring circuit being adjustably connected to said slidewire at a point thereon which is closer to two of said separated points other than said first point.

3. An extended range recorder comprising:
   (a) a slidewire including a contact movable along said slidewire and connected to a measuring circuit to provide an electrical balance to said measuring circuit in accordance with the magnitude of an external condition under measurement,
   (b) a continuous marking device coupled with said movable contact for providing a record of the magnitude of the external condition under measurement on information receiving means of said recorder,
   (c) a multi-terminal electrical voltage source for providing successively higher or lower levels of source voltage,
   (d) switching means coupled with said movable contact for successively connecting higher or lower levels of said source voltage to said slidewire to provide higher or lower orders of voltage ranges available to said measuring circuit to extend the measuring range therefor,
   (e) said switching means and said slidewire characterized in that
      (1) at least three spaced taps on said slidewire are connectable via said switching means to successive voltage levels of said multi-terminal voltage source,
      (2) said switching means switches a first of said slidewire taps to the next higher or lower level voltage source than that source connected to a second slidewire tap adjacent said first slidewire tap in a direction opposite to the direction of movement of said contact, thus extending the measuring range of said balanceable network, and
      (3) said contact is always operating within a portion of said slidewire between an adjacent two of said spaced taps not including said first tap.

4. An extended range recorder as defined in claim 3 wherein said slidewire comprises a 360° circular resistance element.

5. An extended range recorder as defined in claim 3 wherein said multi-terminal source of successively varying voltage sources comprises a multi-terminal resistance connected in parallel with a stable source of electric potential.

6. A recorder as defined in claim 5 wherein said switching means comprises at least three rotary switches, each including a plurality of spaced contacts and a selector contact, each of said spaced contacts being connected to terminals of said multi-terminal resistance, successive spaced contacts of each rotary switch being connected to terminals of said resistance spaced with a total number of intervening terminals equal to the number of rotary switches employed minus one, and the selector contact of each of said rotary switches being connected to respective taps of said circular slidewire.

7. The extended range recorder as defined in claim 6 wherein said switching means comprises three rotary switches with the selector contact of each respective rotary switch being connected respectively to one of three taps on said circular slidewire.

8. An extended range recorder as defined in claim 7 wherein said three taps of said circular slidewire are spaced at 120°.

9. An extended range recorder as defined in claim 3 wherein said continuous marking device comprises a plurality of marking elements, said plurality equaling in number the number of said taps on said slidewire, said marking elements being interconnected such that only one marking element at a time is operable through an entire recorder range to record on said information receiving means and further such that at about the time when said movable contact of said slidewire moves from one recording portion to a next successive portion thereby to extend the available measuring range of said measuring circuit, a second of said plurality of marking elements comes into engagement with said information receiving means at a recording location opposite to the recording location to be vacated by the first of said marking elements.

10. An extended range recording system comprising:
  (a) a transducer for converting an external condition into an equivalent electrical signal,
  (b) a balanceable network connected to said transducer,
  (c) a detector connected to said balanceable network for detecting unbalance of the same,
  (d) a balancing motor driven by said detecting means for converting the electrical signal indicative of an external condition to an equivalent mechanical rotational displacement,
  (e) a circular slidewire including first, second, and third taps spaced at 120° intervals and a contact adjustable therealong, said contact being mechanically connected to said balancing motor for adjustment upon rotation thereof in accordance with the amount of unbalance detected by said detecting means, said slidewire delivering to said balanceable network via said contact a rebalancing signal acting to return said balanceable network to a balanced condition,
  (f) chart marking means mechanically connected to said contact such that said marking means indicates on chart paper the magnitude of the external condition being measured as determined by the physical position of said contact upon balance of said balanceable network, said marking means including three marking elements interconnected such that only one of said marking elements records within a complete range of said chart paper at any one time,
  (g) a multi-tapped voltage divider connected in parallel with a stable electric source to provide successive higher levels of voltage at successive taps,
  (h) switching means interconnecting said successive taps on said voltage divider to said slidewire taps, said switching means being mechanically operable via mechanical connection with said contact of said slidewire and being electrically interconnectable between said taps of said slidewire and said successive taps of said voltage divider such that movement of said slidewire contact through a predetermined point on said slidewire between first and second successive taps thereon causes the third of said slidewire taps to be disconnected from the voltage source tap to which it was previously connected and to be then connnected to another voltage source tap adjacent the tap connected to either said first or said second slidewire taps, the adjacent tap being determined by whichever adjacent tap is a different tap from the said third tap being disconnected and reconnected, thereby providing a continuous change in the range of voltage supplied to said balancing network.

11. A null-balance, multi-range recorder of the type which employs continuous marking means for the production of a plurality of time displaced curve segments in a width of recorder chart when recording the value of a measured quantity which is variable over a range greater than that provided by a single traverse by said marking means of said width of chart and which further employs means for applying range identification information to said chart to provide for reading the value of said measured quantity from a curve segment, characterized in that there is included in a balancing circuit of said null-balance recorder a circular slidewire having three or more equally spaced taps defining segments of said slidewire, slidewire contact means, motive means relatively to adjust said slidewire and contact means upon unbalance of said recorder, a plurality of sources each having an impedance which is low relative to that of said slidewire selectively connectable by a multi-point switch means to said taps for establishing a potential gradient around said slidewire, said switch means including structure sequentially to change connections between said taps and sources one at a time thereby to disconnect one of said taps from one source and thereafter connect said tap to another source progressively to alter the level of the potential gradient about said slidewire in discrete steps, a connection between the continuous marking means and said motive means establishing a recording range relation between a portion of said circular slidewire and the width of chart of the recorder upon which the value of the measured quantity is to be recorded, said portion being limited to exclude the two of said segments adjacent one of said taps, and a connection between said continuous marking means and said switch means to effect operation of said switch means to change connections to said one of said taps during the time said slidewire contact means is operating in said portion of said slidewire which excludes said two of said segments.

12. An extended range recorder of the type including in combination an automatic self-balancing measuring circuit having a balancing motor and slidewire, a chart, means for driving the chart, marking means for making a record on the chart, and a drive connection between the balancing motor and the marking means producing movement of said marking means in response to a change in the magnitude of a measured quantity to be recorded, the improvement wherein:
  said slidewire is a circular slidewire having three or more equally spaced taps therealong defining a plurality of slidewire segments and the slidewire contact is relatively adjustable about said slidewire by said balancing motor to balance said measuring circuit,
  a tapped resistor having an impedance such that the impedance of each element thereof between taps has an impedance which is low compared to that of each of said slidewire segments,
  a source of electric power connected in series with said tapped resistor,
  switch means for sequentially connecting adjacent elements of said tapped resistor in parallel respectively with adjacent segments of said slidewire, and
  a drive connection between said balancing motor and said switch means including means to switch the connection between one of the taps of said tapped resistor and one of said taps of said slidewire at a time when said slidewire contact is contacting a segment of said slidewire other than the segments directly connected to said tap being switched.

References Cited

UNITED STATES PATENTS 2,625,458  1/1953  Ruhland _____ 346—34
2,661,260  12/1953  Salzman _____ 346—65

RICHARD B. WILKINSON, *Primary Examiner.*

JOSEPH W. HARTARY, *Assistant Examiner.*

UNITED STATES PATENT OFFICE
CERTIFICATE OF CORRECTION

Patent No. 3,380,066                         April 23, 1968

Rowland G. Lex, Jr.

It is certified that error appears in the above identified patent and that said Letters Patent are hereby corrected as shown below:

Column 3, line 12, "element" should read -- elements --; line 43, after "respectively" insert a comma. Column 5, line 3, "volt" should read -- volts --. Column 6, line 35, cancel "the", second occurrence; line 55, after "A-D" insert -- spaced --. Column 7, line 8, "0 to volt" should read -- 0 volts --; line 9, "2.0 volts" should read -- 2.0 volt --. Column 8, lines 63 and 65, '"10"', each occurrence, should read -- "1.0" --. Column 9, line 5, "pinciples" should read -- principles --.

Signed and sealed this 23rd day of December 1969.

(SEAL)
Attest:

Edward M. Fletcher, Jr.                      WILLIAM E. SCHUYLER, JR.
Attesting Officer                                Commissioner of Patents